(12) United States Patent
Rodenheber et al.

(10) Patent No.: US 10,414,597 B2
(45) Date of Patent: Sep. 17, 2019

(54) PALLET CAR FOR THE TRANSPORT OF BULK MATERIAL FOR A THERMAL TREATMENT

(71) Applicant: OUTOTEC (FINLAND) OY, Espoo (FI)

(72) Inventors: Timo Rodenheber, Frankfurt (DE); Roger Becker, Pfungstadt (DE); Pierre Manthey, Oberursel (DE); Astrid Asquino, Bad Vilbel (DE); Till Weber, Tübingen (DE); Michael Ströder, Frankfurt am Main (DE); Isabella Vandermaelen, Steinbach (DE)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/060,685

(22) PCT Filed: Dec. 12, 2016

(86) PCT No.: PCT/EP2016/080618
§ 371 (c)(1),
(2) Date: Jun. 8, 2018

(87) PCT Pub. No.: WO2017/102637
PCT Pub. Date: Jun. 22, 2017

(65) Prior Publication Data
US 2018/0362261 A1 Dec. 20, 2018

(30) Foreign Application Priority Data
Dec. 15, 2015 (DE) .................. 10 2015 121 829

(51) Int. Cl.
*B65G 35/08* (2006.01)
*C22B 1/20* (2006.01)
(Continued)

(52) U.S. Cl.
CPC ............ *B65G 35/08* (2013.01); *C22B 1/20* (2013.01); *F27B 21/06* (2013.01); *F27D 3/123* (2013.01);
(Continued)

(58) Field of Classification Search
None
See application file for complete search history.

(56) References Cited

U.S. PATENT DOCUMENTS 6,523,673 B1 * 2/2003 Fenton, Jr. ............ B65G 35/08
198/465.1
9,284,127 B2 * 3/2016 Heinsohn ............... B62D 65/18
2014/0021016 A1 1/2014 Schulakow-Klass et al.

FOREIGN PATENT DOCUMENTS

CN 202547381 U 11/2012
CN 104896930 A 9/2015
(Continued)

OTHER PUBLICATIONS

International Search Report (PCT/ISA/210) dated Feb. 17, 2017, by the European Patent Office as the International Searching Authority for International Application No. PCT/EP2016/080618.
(Continued)

*Primary Examiner* — Kavel Singh
(74) *Attorney, Agent, or Firm* — Buchanan, Ingersoll & Rooney PC

(57) ABSTRACT

Provided is a pallet car for the transport of bulk material for a thermal treatment thereof. The pallet car comprises a frame with at least two opposed cross-beams on which grate bars rest and two end pieces each connecting the cross-beams with each other, which each include at least two rollers and at least one side wall. In the pallet car, the grate bars and/or the side walls and/or the insulating plates are made of a ceramic fiber composite, wherein the fibers are metallic and high-temperature resistant.

15 Claims, 4 Drawing Sheets

(51) Int. Cl.
    *F27B 21/06* (2006.01)
    *F27D 3/12* (2006.01)
(52) U.S. Cl.
    CPC .... *B65G 2201/045* (2013.01); *B65G 2207/22* (2013.01); *B65G 2812/02633* (2013.01)

(56) References Cited

FOREIGN PATENT DOCUMENTS

| CN | 107935612 A | 4/2018 |
| DE | 10 2011 016 467 A1 | 10/2012 |
| JP | H04-193774 A | 7/1992 |
| JP | 2001-146485 A | 5/2001 |

OTHER PUBLICATIONS

PCT International Preliminary Report on Patentability (IPRP) and Written Opinion dated Jun. 28, 2018, in corresponding International Application No. PCT/EP2016/080618 (10 pages).

Notification of the First Office Action issued by the State Intellectual Property Office of the People's Republic of China in corresponding Chinese Patent Application No. 201680072953.6 dated Mar. 22, 2019 (16 pages including partial English translation).

\* cited by examiner

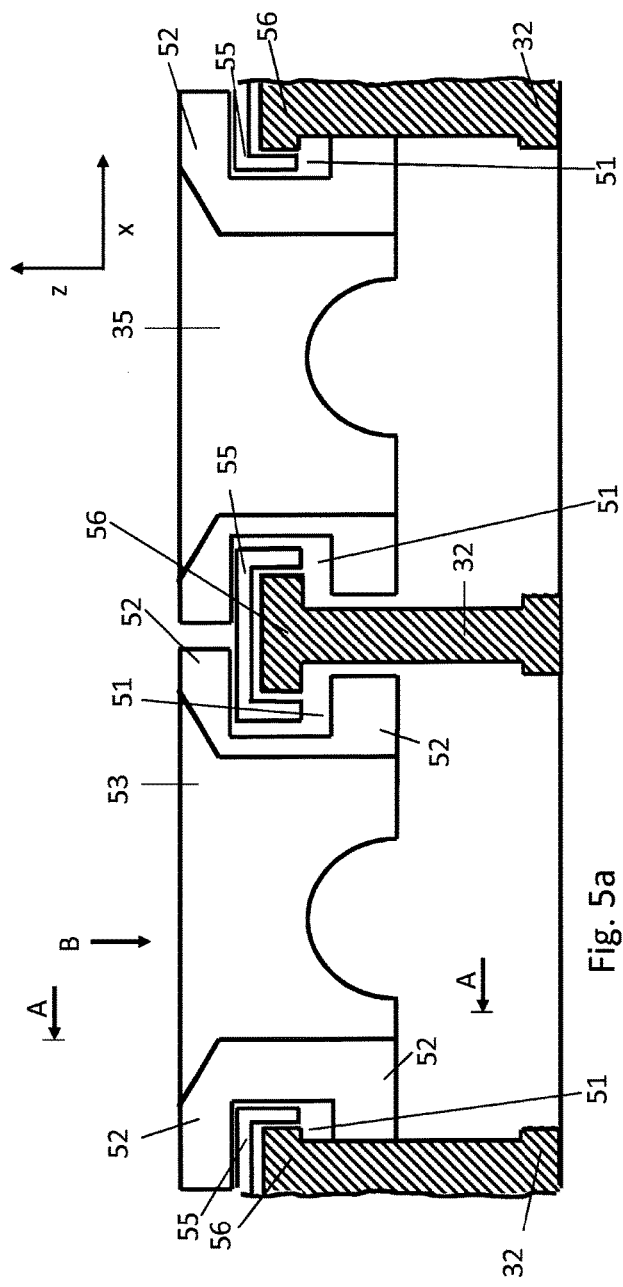
Fig. 5a
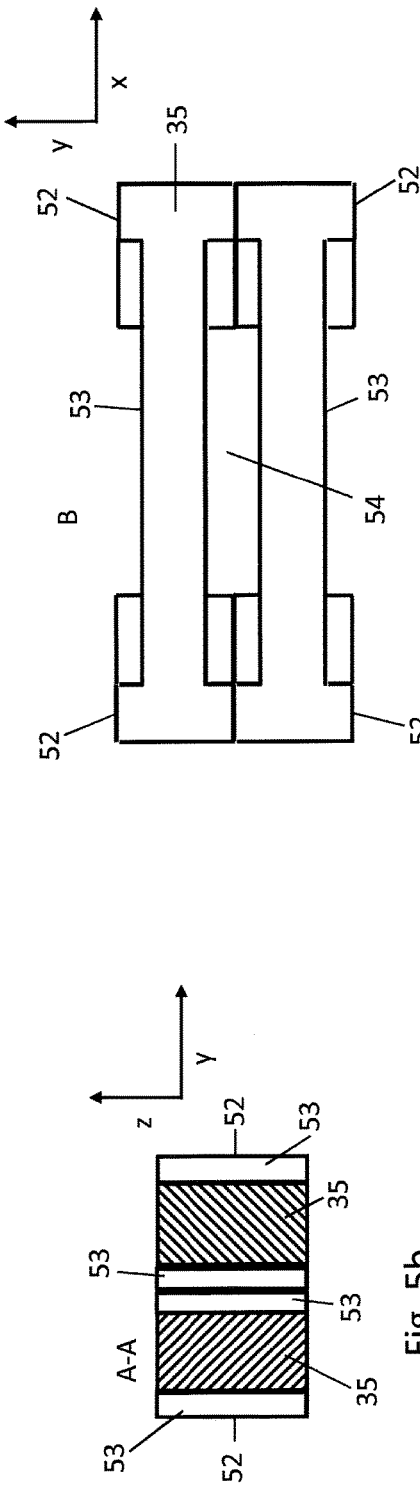
Fig. 5c
Fig. 5b

PALLET CAR FOR THE TRANSPORT OF BULK MATERIAL FOR A THERMAL TREATMENT

The present invention relates to a pallet car for the transport of bulk material for a thermal treatment thereof, comprising a frame which on two opposite sides includes rollers and two side walls. Furthermore, the invention also comprises a method for filling this pallet car.

In pelletizing, roasting or sintering plants the bulk material to be treated, for example iron ore, manganese ore, lead or zinc ore or also iron oxides, is charged onto pallet cars. These pallet cars consist of a frame equipped with wheels and of grate bars arranged on cross-beams. A plurality of such pallet cars forms an endless pallet car chain, which also is referred to as traveling grate.

Figure 1:
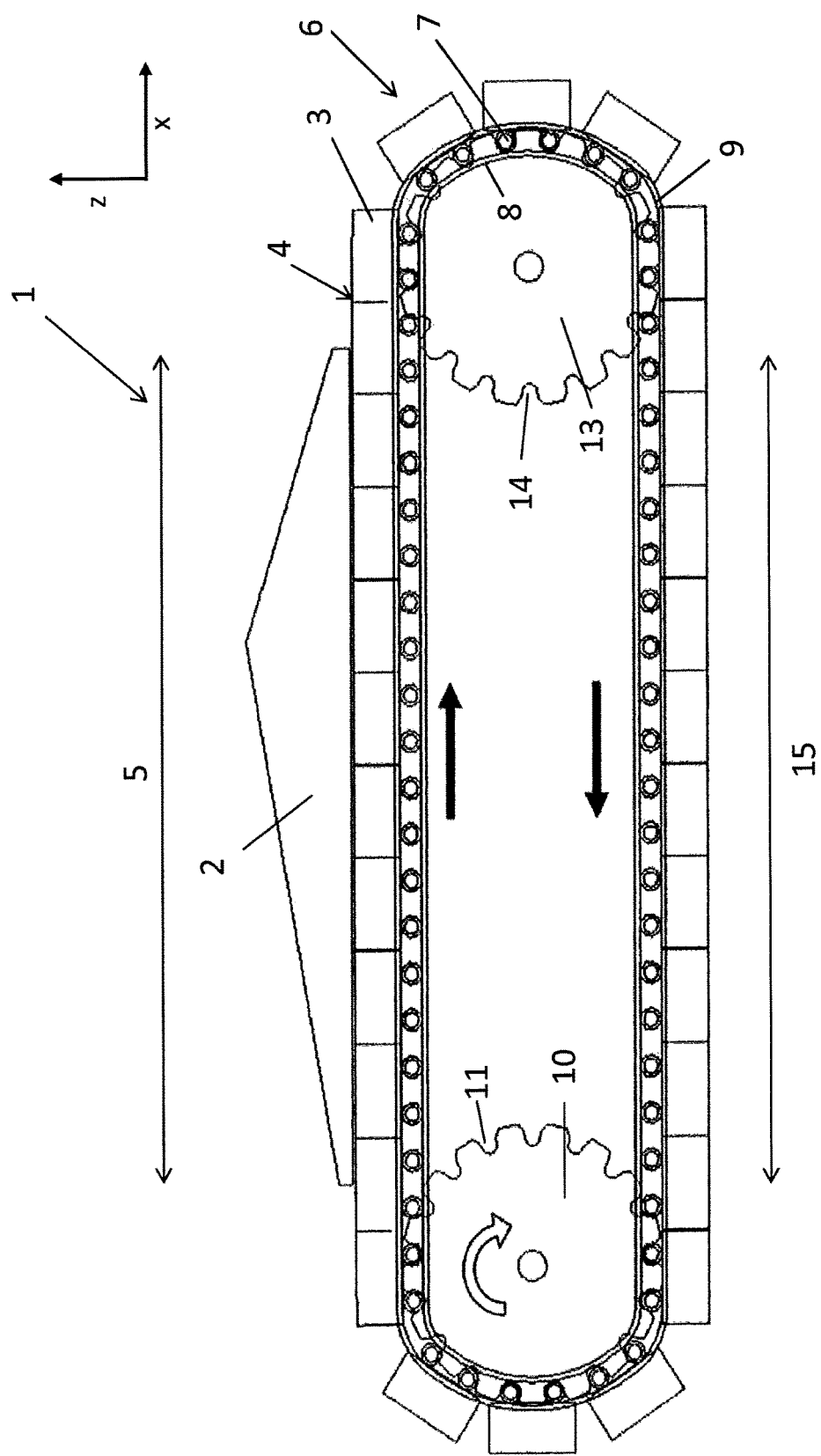

FIG. 1 by way of example shows a pellet firing machine 1 also referred to as pellet firing oven or pellet induration furnace for the production of fired iron ore pellets, in which the present invention is used. At a supply station before a hood 2, green pellets in this case are charged as bulk material onto pallet cars 3 which form an endless pallet car chain referred to as traveling grate 4. Under the hood 2 the bulk material transported on the pallet cars 2 passes through a plurality of thermal treatment stations. In details, these stations are:
1. the charging zone,
2. the first drying zone,
3. the second drying zone,
4. the preheating zone,
5. the firing zone,
6. the after-firing zone,
7. the cooling zone, and
8. the discharge zone.

In these zones the pallet cars are charged with the material, the bulk material is dried, preheated, fired and subsequently cooled again. At the treatment stations under the hood 2 the traveling grate is guided on an upper run 5 of a continuous conveyor 6, wherein the track rollers 7 of the pallet cars 3 are guided between an inner rail guide 8 and an outer rail guide 9. The drive of the traveling grate 4 is effected via a drive or lifting wheel 10 which is formed as gearwheel and with its tooth gaps (cutouts 11) engages the track rollers 7 of the pallet cars 3.

After passing through the hood 2, the pallet cars 3 of the traveling grate 4 reach a discharge station which is associated to a lowering or driven wheel 13 of the continuous conveyor 6. At the lowering wheel 13, like at the lifting wheel 10, tooth gaps 14 of the driven gearwheel engage the track rollers 7 of the pallet cars 3. The pallet cars 3 are tilted, so that their load is dumped by gravity. Since the pallet cars 3 are guided by the outer rail guide 9, they do not fall down themselves, but are guided back to the lifting wheel 10 hanging upside down in a lower run 15 of the continuous conveyor 6.

In normal operation, the traveling grate 4 endlessly circulates on the continuous conveyor 6 and transports the bulk material to be treated through the treatment stations under the hood 2, before it is dumped at the discharge station and processed further in a non-illustrated way.

To protect the pallet car against the thermal load caused by the high process temperatures in the bulk material layer, it is attempted to prevent the material to be treated from having a direct contact with parts of the pallet car. In addition, sticking of green pellets to the metallic components of the pallet car should thus be prevented. For this purpose, a so-called hearth layer on the one hand is applied onto the described grate surface of the pallet car. Furthermore, the pallet car usually includes two side walls which proceeding from the grate surface are formed parallel to the direction of movement of the traveling grate and extend upwards proceeding from the grate surface, wherein the angle to the pallet car surface each lies between 90° and 120°. After the hearth layer has been applied, the side walls likewise are protected by applying a so-called side layer, i.e. a bed along the side walls. Subsequently or at the same time, the so-called green pellet charge is applied between the side layers and on top of the hearth layer, i.e. the charge of the bulk material which is to be subjected to the thermal treatment.

For the hearth layer and the side layer there is usually employed material which already has passed through the thermal treatment, i.e. so-called fired pellets. This has the advantage that on dumping the pallet cars a homogeneous product is obtained, as the pellets fired already do not react further when again passing through the thermal treatment and thus at the end of the hood all pellets in the pallet cars have the same material properties. A further separation of foreign material thus is not necessary.

Nevertheless, however, charging with hearth layer and side layer has the disadvantage that the filling volume of the pallet car for green pellets is reduced. Typically, a hearth layer has a layer thickness between 3 and 15 cm, while the side layer has a thickness between 5 and 15 cm.

On the one hand it therefore is the idea underlying the invention to increase the filling volume of a pallet car for the bulk material to be treated thermally.

In addition, the application of hearth layer and side layer makes it necessary to store and recirculate the material required therefor, wherein in part sifting of the material recirculated as hearth and side layer also is necessary, in order to avoid an accumulation of dust in the plant. An omission of the hearth and/or side layer therefore also would have the advantage that the equipment expenditure in connection with these protecting layers, for example the hearth layer chute and/or the side layer chutes, might be omitted completely. If hearth and side layers can be omitted, the conveyor belts no longer are required either, which usually convey the hearth and side layer material into the charging zone.

Furthermore, with the current condition of the side walls problems in principle exist with regard to the tightness. Typical side walls usually consist of four lower and eight upper parts, which in general are fabricated of cast steel and in vertical direction are connected with each other and towards the frame of the pallet car by bolts. Due to the high temperatures, which exist in certain zones of the process, the side walls are thermally stressed to the same extent as due to the fact that within about one hour they are subjected to a complete temperature cycle including heating up and cooling down and also are exposed to a strong abrasive load due to the iron oxide dust particles present. There also is the mechanical load due to the pellet bed between the side walls. This leads to the fact that the side walls partly are deformed and thus undesired leakages occur between their individual parts, which within the process lead to a leakage loss with the related disadvantages of a higher energy consumption and the necessity of sucking off the leakage streams exiting to the outside as well as locally different reaction conditions. Finally, due to the material stresses described above the bolts connecting the side wall parts with each other also can work loose, so that even dropping off of the side wall can occur in part. So far, it therefore is required to regularly service the side walls and the associated bolt connections.

Consequently, it likewise is the object of the present invention to provide a pallet car with reduced maintenance expenditure as regards the side walls and their bolt connections as well as greater operational safety and longer useful life.

In summary, it therefore is the object of the invention to provide a pallet car which has a larger filling volume for green pellets and at the same time requires less operating expenditure in regular operation and for maintenance.

Figure 3:
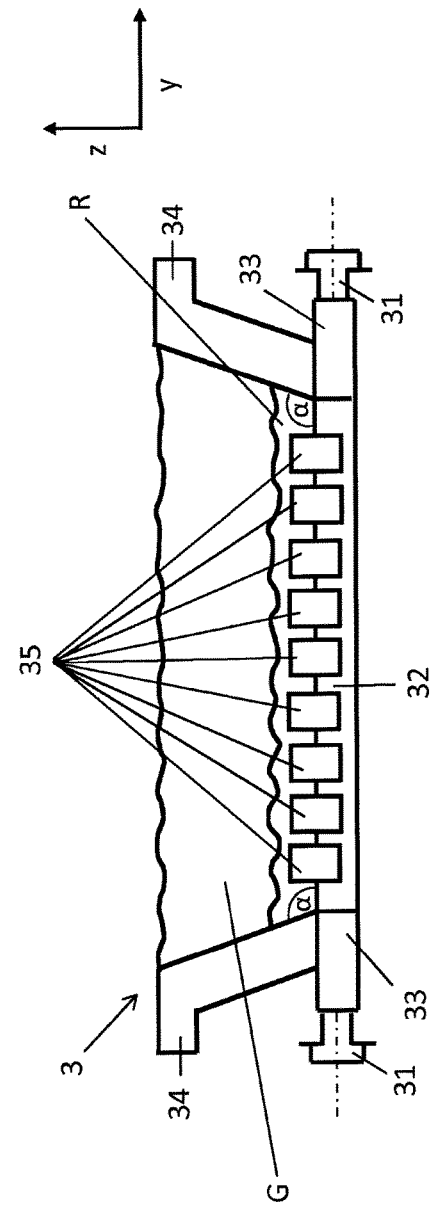

This object is solved with a pallet car with the features of claim 1. Such pallet car includes a frame which has rollers on two opposite sides. On the same sides there are also provided two side walls which proceeding from the pallet car extend at an angle α (as also shown in FIG. 3) from 90 to 120°. Moreover, what has been said with respect to FIG. 1 also applies for the configuration of the pallet car.

It is the subject-matter of the invention that the side-walls and/or the grate bars now no longer are fabricated of cast steel, but rather consist of a ceramic composite material, which contains high-temperature resistant metallic fibers.

Ceramic fiber composites are a class of materials within the group of composite materials or also technical ceramics. They are characterized by a ceramic matrix embedded between fibers, which is reinforced by fibers and thus becomes a fiber-reinforced composite ceramic. This class sometimes also is designated with the term "ceramic matrix composites" (CMC). In principle, the matrix can consist of all ceramic materials known.

The term "ceramic" in the sense of the invention designates materials which largely are formed of inorganic, fine-grained raw materials by addition of water and are hardened in a subsequent firing process with temperatures above 700° C. The term composite material relates to the connection between the ceramic material and the high-temperature resistant, metallic fibers contained therein, wherein high-temperature resistant is to be regarded as temperature-resistant above 1000° C.

This completely new design of the grate bars and/or the side walls has the advantage that the grate bars and/or the side walls now no longer must be protected against the pellets contained in the pallet car with regard to an accretion of the material or also the temperatures within the pallet car by means of a hearth and/or side layer. The thickness of the hearth and/or side layer can be reduced significantly or a hearth and/or side layer even can be omitted completely. This results in a larger filling volume of the pallet car for green pellets. At the same time, this material in principle also provides for an extended durability of the grate bars and/or side walls, so that the same do not have the currently necessary high need for maintenance either due to the temperature load or due to the abrasive load. An increase of the useful life of the grate bars and/or side walls, before they must be replaced by new grate bars and/or side walls, likewise is an objective of the invention.

It is preferred that at least one grate bar, preferably all grate bars, shows at least one salient such that its supporting surface area at which it rests on at least one cross-beam of the pallet car frame is reduced. Since the invention enables a lower- or even no-layer thickness of fired pellets as hearth and/or side layer, temperature of the grate bars will rise. By lowering their supporting surface resting on the cross-beams heat transfer from the grate bar to the supporting surface can be reduced, resulting in a limitation of the thermal stress to the frame of the pallet car.

In addition or alternatively an insulating plate is provided between at least one metallic part of the pallet car and the grate bar featuring a specific heat capacity of more than 500 J $kg^{-1}$ $K^{-1}$, preferably more than 510 J $kg^{-1}$ $K^{-1}$, even more preferably more than 750 J $kg^{-1}$ $K^{-1}$, most preferably more than 1000 J $kg^{-1}$ $K^{-1}$ and/or featuring a specific heat conductivity of less than 35 W $m^{-1}$ $K^{-1}$, preferably less than 30 W $m^{-1}$ $K^{-1}$, even more preferably less than 15 W $m^{-1}$ $K^{-1}$ and most preferably less than 5 W $m^{-1}$ $K^{-1}$. Thereby, it is also possible to reduce heat transfer from the heated grate bars to the metallic parts of the pallet car, especially in the light of the cycling nature of thermal stress to the pallet cars in the described traveling grate application.

Most preferred the insulating plate is also made of a ceramic material or ceramic matrix composite made of any ceramic material described in this application. Such an insulating plate features a specific heat capacity of 1100 J $kg^{-1}$ $K^{-1}$ and a specific heat conductivity of 4 W $m^{-1}$ $K^{-1}$, whereby the metallic cross-beams of the pallet car can reliably be protected from temperatures above 750° C.

It is one aspect of the invention that the matrix material of the ceramic composite material is a material containing aluminum oxide and/or silicon oxide. The material containing silicon oxide generally is raw materials in which a $[SiO_4]^{4-}$ tetrahedron crystal structure is incorporated. Aluminum oxide ceramics above all are based on α-$Al_2O_3$ (corundum).

It was also found to be favorable when the ceramic material is oxide ceramics, in particular α-$Al_2O_3$. Oxide ceramics comprise single-component systems such as aluminum oxide, magnesium oxide, zirconium oxide and titanium oxide just like multi-component systems such as for example aluminum titanate, mullite ($Al_2Al_2+2xSi_2-2xO_{10}$-x with x=oxygen vacancies per elementary cell), andalusite ($Al_2[O|SiO_4]$) or dispersion ceramics such as aluminum oxide reinforced with zirconium oxide.

The use of mullite, which is a rather rarely occurring mineral from the mineral class of the silicates, and/or of andalusite, a frequently occurring island silicate, was found to be particularly favorable.

What here is favorable above all is the use of further ioxidic raw materials, such as zirconium oxide, whereby special properties are achieved. What also is preferred is the presence of a mixed phase of $Al_2O_3$ and $SiO_2$, which particularly preferably also contains iron oxide, calcium oxide, magnesium oxide, zirconium oxide and silicon carbide.

The ceramic material favorably contains between 50 and 75 wt-%, preferably 58 to 68 wt-% of $Al_2O_3$, particularly preferably α-$Al_2O_3$, 25 to 40 wt-%, preferably 28 to 37 wt-% of $SiO_2$, <5 wt-%, preferably <4 wt-% of CaO, <1 wt-%, preferably <0.6 wt-% of $Fe_2O_3$, <0.5 wt-%, preferably <0.2 wt-% of MgO and <2 wt-%, preferably <1.2 wt-% of other materials.

Particularly preferably the ceramic material contains between 70 and 90 wt-%, preferably 78 to 87 wt-% of $Al_2O_3$, particularly preferably α-$Al_2O_3$, 5 to 20 wt-%, preferably 8 to 17 wt-% of $SiO_2$, 0.5 to 5 wt-%, preferably 1.5 to 3.5 wt-% of CaO, <0.5 wt-%, preferably <0.3 wt-% of $Fe_2O_3$, <0.5 wt-%, preferably <0.2 wt-% of MgO and <0.5 wt-%, preferably <0.2 wt-% of other materials.

Another particularly preferred ceramic material contains between 40 and 60 wt-%, preferably 46 to 52 wt-% of silicon carbide, 15 to 25 wt-%, preferably 17 to 20 wt-% of $Al_2O_3$, particularly preferably α-$Al_2O_3$, 15 to 25 wt-%, preferably 17 to 20 wt-% of $SiO_2$, 5 to 18 wt-%, preferably 8 to 16 wt-% of $Zr_2O_3$, 0.5 to 5 wt-%, preferably 1.5 to 3.5 wt-% of CaO, <1 wt.-%, preferably <0.5 wt.-% of $Fe_2O_3$, <0.5 wt-%, preferably <0.2 wt.-% of MgO and <1 wt.-%, preferably <0.5 wt.-% of other materials.

The above given compositions prevent the ceramics from quick damage as a consequence of thermal shocks.

Another aspect of the invention provides that the fibers contain iron, carbon, chromium, silicon, aluminum, manganese and/or nickel and thus have melting points distinctly above 1200° C. and at high temperatures form a stable and largely diffusion-tight oxide skin.

Preferably the fibers have a length of 10 to 100 mm, particularly preferably 20 to 60 mm, as in this way easy processability can be combined with optimum material properties.

What is preferred are compositions which contain between 20 and 30 wt-%, preferably 23 to 27 wt-% of chromium, between 15 and 25 wt-%, preferably 18 to 23 wt-% of nickel, between 1 and 5 wt-%, preferably 3 to 4 wt-% of silicon, between 1 and 5 wt-%, preferably 2 to 4 wt-% of aluminum, between 1 and 3 wt-%, preferably 1.5 to 2.5 wt-% of manganese, between 0.1 and 1 wt-%, preferably 0.4 to 0.6 wt-% of carbon, between 0.01 and 0.1 wt-%, preferably 0.04 to 0.06 wt-% of phosphorus, and between 0.01 and 0.05 wt-%, preferably 0.02 to 0.04 wt-% of sulfur and the remaining fraction to 100 wt-% of iron.

What also is preferred are compositions which contain between 25 and 45 wt-%, preferably 32 to 39 wt-% of nickel, between 10 and 30 wt-%, preferably 15 to 22 wt-% of chromium, between 2.5 and 5 wt-%, preferably 3 to 4 wt-% of silicon, between 1 and 5 wt-%, preferably 2 to 4 wt-% of aluminum, between 1 and 3 wt-%, preferably 1.5 to 2.5 wt-% of manganese, between 0.1 and 1 wt-%, preferably 0.4 to 0.6 wt-% of carbon, between 0.01 and 0.1 wt-%, preferably 0.04 to 0.06 wt-% of phosphorus and between 0.01 and 0.05 wt-%, preferably 0.02 and 0.04 wt-% of sulfur and the remaining fraction to 100 wt-% of iron.

What also is particularly favorable are compositions which contain between 10 and 30 wt-%, preferably 15 to 23 wt-% of chromium, between 2.5 and 5 wt-%, preferably 3 to 4 wt-% of silicon, between 1 and 5 wt-%, preferably 2 to 4 wt-% of aluminum, between 1 and 3 wt-%, preferably 1.5 to 2.5 wt-% of manganese, between 0.1 and 1 wt-%, preferably 0.4 to 0.6 wt-% of carbon, between 0.01 and 0.1 wt-%, preferably 0.04 to 0.06 wt-% of phosphorus and between 0.01 and 0.05 wt-%, preferably 0.02 and 0.04 wt-% of sulfur and the remaining fraction to 100 wt-% of iron.

It is also possible that any composition given about also contains between 0.001 and 1 wt-% impurities like Cu, K, Na or Ni.

All given fiber compositions are preferred due to the fact that such fibers are high temperature resistant. Especially the oxides of chromium and alumina form a protecting layer around the fibers.

Furthermore, it was found to be favorable when the fiber content in the composite material lies between 10 and 90 wt-%, preferably is 20 to 40 wt-%, as in this way a higher elongation at break, a distinctly higher crack resistance, a very good thermal shock resistance, a better dynamic loadability and isotropic properties can be achieved.

It also is favorable to add polystyrene, for example in the form of beads. In another variant the addition of wood, for example as sawdust, also is favorable. Both has the advantage that it is burnt on firing the ceramic material and thus small cavities are obtained. The weight and the thermal conductivity of the component thus can be reduced distinctly.

The side wall favorably is formed as one part only, as in this way the additionally present bolt connections in the conventional side walls can be omitted. When the side walls are formed of cast steel, the one-part construction of the side wall is unfavorable, because the coefficient of thermal expansion of the high-temperature resistant cast steel is too high and therefore inadmissibly high thermal expansions would occur along the length of typically 1500 mm. In the case of the composite material according to the invention the coefficient of thermal expansion is much lower, so that the thermal expansion of a one-part side wall can be tolerated.

However, this involves the disadvantage that due to their own high weight such side walls are very difficult to handle. Another aspect therefore provides to divide a side wall into three segments, wherein these segments each extend over the full height of the side wall and thus include three segments of a side wall arranged one beside the other. This division still has the advantage that distinctly less elements to be connected are used, but at the same time the individual segments can be carried by a single person.

Another possibility according to the invention consists in manufacturing each side wall in one part and cast at least one, more preferably however two threaded sleeves into the composite ceramic at the upper edge of each side wall, into which lifting eyes or hooks can be mounted, so that the one-part side wall can be handled by a lifting gear.

Furthermore it was found to be favorable to fasten the side walls to the frame of the pallet car by screws and/or bolts, as in this way they can be exchanged easily. A preferred aspect of the side wall according to the invention provides that at least one metallic holder is cast into the same, which protrudes beyond that surface of the side wall which in operation is oriented towards the frame or rests on the frame on this surface and is used for fastening to the frame. Hence, the advantages of a metallic material for fastening with the frame still can be used despite the changed material of the side wall. In the case of only one metallic holder, the side wall can be prevented from rotating with respect to the pallet car by means of pins or other positive-locking connection components. The replacement of a side wall or a side wall segment then can be effected particularly fast. It likewise also is possible to provide a device for accommodating a fastening element in the wall, whereby the same likewise can reliably be anchored with the frame of the pallet car.

Preferably, each side wall includes a metallic carrier plate which in the mounted condition faces the frame and thus directly or indirectly rests on the frame, which carrier plate at least partly extends between side wall and frame. Such metallic carrier plate likewise serves to simplify assembly.

It also was found to be favorable when the metallic carrier plate extends beyond the frame transversely to the direction of movement and thus the clear distance between the two side walls of a pallet car is increased. Hence, the capacity of the pallet car can be increased in addition.

It was furthermore found to be favorable when the side walls are formed such that they get thicker towards the frame in terms of their width. The flow profile of the gas flow which flows through the bed hence can be homogenized over the entire bed. In addition, downward broadening is recommendable, because the bending moment from the pellet bed onto the side wall increases in downward direction (at the top the bending moment is 0, at the bottom maximal). At an angle $\alpha > 90°$ the outside surfaces of the side walls thus might be vertical, for example.

For the grate bars of ceramic fiber composite largely the same applies as what is described for the side walls of ceramic fiber composite. However, there are two essential differences. Firstly, each grate bar is positively held by the upper flanges of the two cross-beams between which the grate bar is mounted. Hence, the grate bar need not be bolted tight or be held in some other way by further components.

On the other hand, in the after-firing zone of the pellet induration furnace the grate bar assumes even higher temperatures than the side walls, as the gas flow directed from top to bottom in the after-firing zone directly sweeps past the grate bars. When the hearth layer is to be omitted completely, the gas flow at the grate bars still must be hot enough to fire the green pellets, which directly lie on the grate bars, to the required quality. Conversely, the cooling air flow in the cooling zone also directly impinges onto the grate bar from below, so that the largest temperature gradients and hence the largest exposure to alternating temperatures occurs at the grate bar.

To ensure that the grate bar of ceramic fiber composite according to the invention reaches a sufficient useful life despite the very high temperatures and the strong exposure to alternating temperatures, its geometry is slightly modified with respect to the known grate bars of cast steel, so that the minimum wall thickness in no direction and at no point of the grate bar is smaller than 20 mm, preferably 25 mm. As a result, there still is a temperature profile within the grate bar, whereby the core of the grate bar reaches slightly lower peak temperatures than the surface. Fast scaling of the metallic fibers in the core of the grate bar thereby is prevented in particular.

Furthermore, in the case of the grate bars of ceramic fiber composite and the possible reduction of the hearth layer thickness or the complete omission of the hearth layer care should be taken that the upper flanges of the cross-beams and the cross-beams of the pallet car altogether are not heated inadmissibly when the pallet car passes through the firing zone and the post-firing zone. For this purpose, the upper flange of each cross-beam preferably is protected by at least one insulating plate which is inserted between the surface of the upper flange and the grate bars and is held in its position by the grate bars. Such insulating plates for the upper flanges of the cross-beams are known already from sintering machines. According to the invention, the insulating plates can be made of a high-temperature resistant metal or also of a ceramic material or also of the same ceramic fiber composite which is described for the side walls and for the grate bars. For a better thermal insulation, the insulating plate can have point- or line-shaped or planiform elevations on its surface pointing to the upper flange of the cross-beam, so that between the elevations air cushions are formed, which have a particularly low conduction of heat. As regards the insulating plates of ceramic fiber composite it was also found to be particularly favorable to add the polystyrene beads or sawdust described already, which outgas during firing of the insulating plates and thereby leave cavities. These cavities further decrease the conduction of heat in the insulating plates.

The grate bars of ceramic fiber composite are mounted in the same way as the known grate bars of cast steel. As a result, the grate bars of ceramic fiber composite also can be used in pallet cars existing already. If insulating plates are used to protect the cross-beams, the surface of the grate rises by few centimeters with respect to the grate surface of the known pallet car without insulating plates, due to the thickness of the insulating plate. However, this is compensated by the fact that the hearth layer can become thinner or be omitted completely. Then, there still remains a larger filling volume of the pallet car for green pellets.

Finally, the invention also comprises a method with the features of claim 15. In such method for the thermal treatment of bulk material, the bulk material is guided through the thermal treatment in a pallet car, wherein the pallet car consists of a frame which on two opposite sides includes rollers and two side walls.

It is the subject-matter of the invention that the grate bars and/or the side walls consist of a ceramic fiber composite, wherein the fibers are metallic and high-temperature resistant, whereby it is possible to incorporate a bed of green pellets partly contacting the grate bars and/or the side walls with reduced hearth and/or side layer or completely without hearth and/or side layer, the previously used hearth and/or side layer thereby is saved, as due to the changed material properties of the grate bars and/or the side walls the risk of a damage by high temperatures and/or sticking of the material no longer does exist.

In summary, the invention thus offers the advantages that the ceramic grate bars and side walls better withstand the thermocyclic load when passing through a typical firing, roasting or sintering process. Furthermore, due to the improved temperature stability of the ceramic side walls the side layer can be saved completely, whereby the filling volume of each individual pallet car for green pellets is increased by 4 to 5% and thus the capacity of an existing plant can be increased by 4 to 5% exclusively with the costs of investment into the changed side walls. When the hearth layer additionally can be saved completely as a result of the ceramic grate bars, the filling volume of each individual pallet car for green pellets even rises by up to 35% depending on the height of the side walls.

Due to the fact that no more side layer is necessary, the equipment for incorporating the side layer also can be saved completely. When in addition the hearth layer no longer is necessary, screening of the fired hearth and side layer pellets as well as the recirculation of these hearth and side layer pellets to the charging zone of the traveling grate and to the chutes for hearth and side layer even can be omitted completely. In new plants this not only results in distinct investment savings, but also distinctly simplifies the operational management. When retrofitting existing plants with ceramic grate bars and side walls, the power consumption and the maintenance expenditure can be reduced by shutting down screens, conveyor belts and chutes.

Furthermore, a lower risk of leakages exists with the ceramic side walls, as less or no points of connection are necessary at all within the side walls. In addition, the side wall according to the invention also better withstands the mechanical load in circulation in a traveling grate, so that the maintenance intervals can be prolonged distinctly.

Finally, the assembly and disassembly of the individual side walls is simplified distinctly, because less bolted connections are to be released or to be produced.

Further objectives, features, advantages and possible applications of the invention can also be taken from the following description of the attached drawings and the example. All features described and/or illustrated form the subject-matter of the invention per se or in any combination, independent of their inclusion in the individual claims or their back-references.

Figure 2:
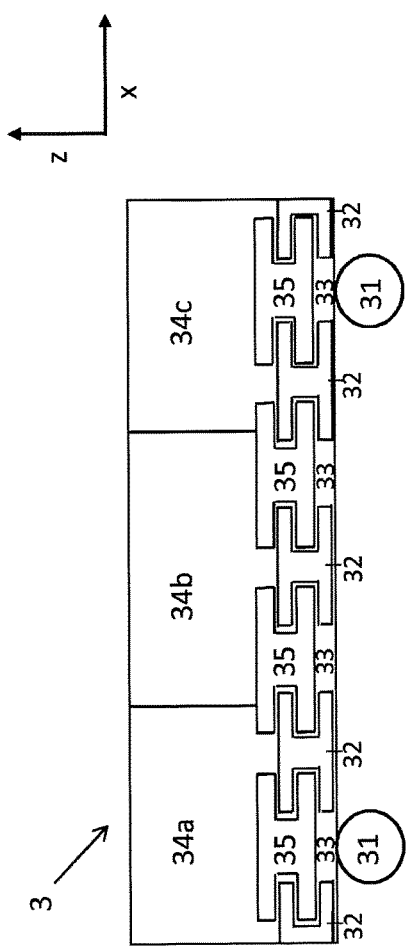
Figure 4:
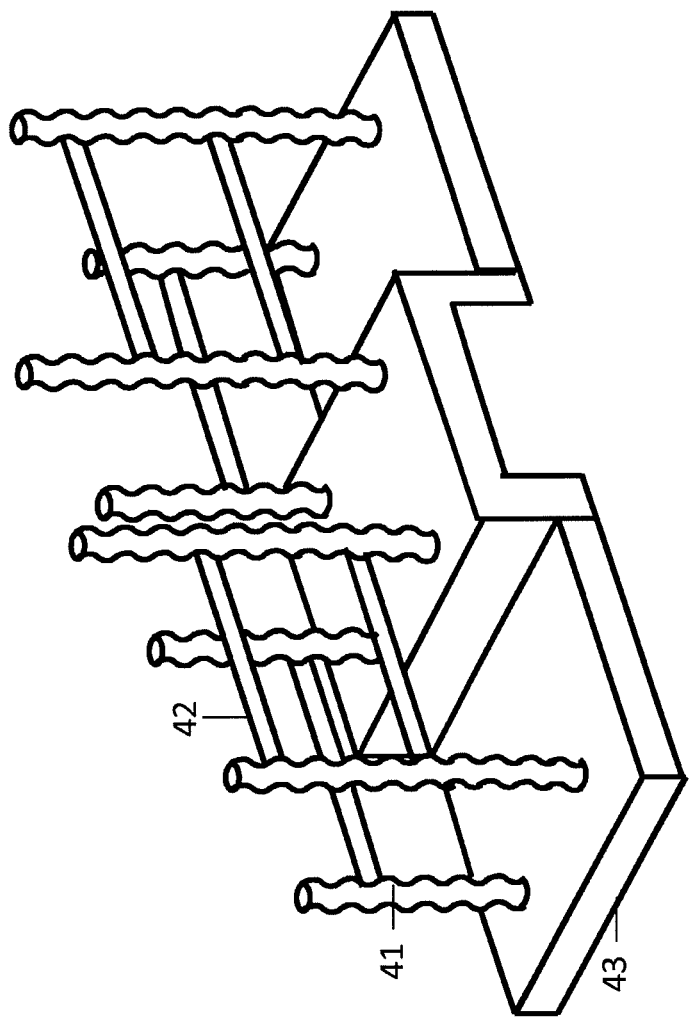

In the drawings:

FIG. 1 shows the construction of a traveling grate as seen in y-direction,

FIG. 2 shows the configuration of a pallet car according to the invention as section in the x-z plane, FIG. 3 shows the configuration of a pallet car according to the invention as section in the y-z plane, FIG. 4 shows the configuration of a holding system for the side wall according to the invention, and FIG. 5 shows a grate bar according to the invention in combination with the insulating plate according to the invention in three views.

FIG. 1 already has been discussed in detail and represents the basic arrangement of a traveling grate, as it is also underlying the present invention.

FIG. 2 shows a pallet car 3 by way of example as section in the same perspective as FIG. 1. The pallet car 3 includes a frame 30 which consists of two end pieces 33 which each are equipped with two rollers 31, and which transversely to the direction of movement of the traveling grate chain preferably has five cross-beams 32 which together with the end pieces 33 not shown in FIG. 2 form the frame 30. The two outer cross-beams typically are formed as C-sections, the middle cross-beams as I- or double-T sections. On these cross-beams 32 the grate bars 35 in turn are arranged, which accommodate the hearth layer R not shown in FIG. 2 and the green pellet layer G of the pallet car. In their longitudinal direction, the grate bars 35 extend in direction of movement x of the traveling grate and bridge the gaps between the cross-beams 32.

FIG. 3 shows the y-z section through the pallet car 3 according to the invention, wherein the sectional plane lies in the middle of the grate bars and the viewer looks from the charging zone of the traveling grate in direction of movement of the traveling grate. The cross-beams 32 form the frame together with the end pieces 33. The wheels 31 are attached to the end pieces. The cross-beams extend almost over the entire height of the frame. On these cross-beams 32 the grate bars 35 are arranged. On these grate bars 35 the so-called heath layer R is applied, which substantially extends as volume over the grate surface of the pallet car 3 formed by the cross-beams 32 and grate bars 35. The number of the actually present grate bars results from the total geometry of the pallet car, wherein the width of a grate bar typically lies between 20 and 50 mm, preferably between 30 and 45 mm, and the length lies between 200 and 450 mm, preferably between 250 and 400 mm. For one typical pallet car between 250 and 500, preferably between 300 and 400 grate bars are used, which only are to be indicated by the illustrated grate bars 35.

From the grate surface of the pallet car 3 two opposite side walls 34 rise at an angle α with values between 90 and 120°, whose course is arranged parallel to the grate bars 35. The side walls 34 are bolted to the end pieces 33. The end pieces with their typical length of 1.5 m are just as long as the side walls and in their longitudinal orientation hence lie in the direction of movement of the traveling grate, which in this representation is defined as x-coordinate.

Enclosed by the side walls 34 and the hearth layer R the green pellet layer G also is located within the pallet car, which contains the material to be fired or to be sintered, which preferably is present as pellets.

FIG. 4 shows an inner steel skeleton of a non-illustrated side wall 34 according to the invention to improve the stability.

It was found to be advantageous to provide the side wall with an internal metallic carrier structure. This carrier structure positively connects the part of the side wall made of ceramic fiber composite with the carrier plate, so that the part of the side wall made of composite material especially in the region of the lower run does not drop off the carrier plate due to gravity. In the case of cracks in the composite material the inner structure also ensures that possibly existing broken pieces are held at their place and do not break out of the side wall. When the side wall is provided with threaded sleeves for lifting eyes, these threaded sleeves also are connected with the inner structure. To compensate the different thermal expansions between composite material and metallic structure and to better produce the positive connection, the inner structure preferably is formed by undulated round bars, which permanently are connected with the carrier plate, e.g. by welding.

The individual holders 41 can be formed straight and/or twisted and/or also—as shown—undulated. Furthermore, it is possible to connect the individual holders 41 among each other with horizontally aligned transverse struts 42 and thus even further increase the stability. The transverse struts also can be straight, undulated or twisted.

The holders 41 are mounted on a carrier plate 43 which serves for attachment on the pallet car 3. The carrier plate 43 is made of steel, preferably cast steel. It is connected with the end pieces 33 of the pallet car in a technically usual way, e.g. by bolts and nuts or by bolts only. For this purpose the carrier plate 43 can include through bores or threaded bores. It also is possible to weld at least one threaded bolt or a bolt with transverse hole for a splint or locking pin to the bottom side of the carrier plate.

FIG. 5 shows a grate bar 35 according to the invention in two views and a section (FIG. 5a in x-z-coordinates, FIG. 5b in z-y-coordinates and FIG. 5c in x-y-coordinates).

Each grate bar typically is mounted between two cross-beams 32 such that the cutouts 51 enclose the edge of the upper flange of the cross-beam. This produces a positive connection, so that the grate bars are securely held in every position of the pallet car without having to be fastened by means of bolts, pins or rivets. It was found to be advantageous when each grate bar has a certain mobility with respect to the cross-beams and with respect to the neighboring grate bar, so that thermal expansions are possible in all directions free of mechanical strain and that possibly stuck pellets or other solid particles can again free themselves due to the relative movements. Each grate bar in addition has surfaces 52 which rest against the neighboring grate bar. Between the surfaces 52 a half slot 53 extends in longitudinal direction of the grate bar, which together with the half slot of the neighboring grate bar forms the slot 54 for the passage of the gas flow through the grate. The insulating plate 55 protects the upper flange 56 of the cross-beam 32 against inadmissibly high temperatures. It can simply be placed on the cross-beam 32, preferably extends along the entire length of the cross-beam from one side wall 34 to the other side wall and is prevented from falling down by the grate bars 35. The insulating plate 55 also can be divided into 2 to 8 parts in longitudinal direction, in order to facilitate the transport, for example.

EXAMPLE

A typical pallet car with a length in direction of movement of the traveling grate (x-coordinate in the representations) of 1500 mm, a mean width in y-direction of 4000 mm and a side wall height in z-direction of 450 mm has a filling volume of 2.586 m$^3$, of which the hearth layer totals 0.606 m$^3$ with a hearth layer thickness of 100 mm, and with a side layer thickness of 80 mm the side layer totals 0.084 m$^3$. When as a consequence of the side walls according to the invention, the side layer can be omitted, this corresponds to an increase of the volume for green pellets of 4.4%. When the hearth layer is omitted completely, but the side layer is maintained, this corresponds to an increase in volume of about 32%. When hearth and side layer are omitted partly or completely, the volume of the pallet car for green pellets can be increased by values in the range between 20 and almost 36%, compared with the operation with side layer and hearth layer.

LIST OF REFERENCE NUMERALS 1 pellet induration furnace
2 hood
3 pallet car
4 traveling grate, pallet car chain
5 upper run
6 continuous conveyor
7 track roller of the pallet car
8 inner rail guide
9 outer rail guide
10 lifting or drive wheel
11 tooth gap
13 lowering or driven wheel
14 tooth gap
15 lower run
30 frame
31 track roller
32 cross-beam
33 end piece
34 side wall
35 grate bar
α angle of the side wall inner surface to the grate
41 holder
42 transverse struts
43 carrier plate
51 cutout on the end face of the grate bar
52 surface for contacting the neighboring grate bar
53 half slot
54 slot
55 insulating plate
56 upper flange of the cross-beam 32
R hearth layer
G green pellet layer

The invention claimed is:

1. A pallet car for the transport of bulk material for a thermal treatment thereof, comprising a frame with at least two opposed cross-beams on which grate bars rest and two end pieces each connecting the cross-beams with each other, which each include at least two rollers and at least one side wall, wherein an insulating plate is provided between at least one part of the pallet car and the grate bar, said insulating plate being made of a ceramic fiber composite, wherein the fibers are metallic and high-temperature resistant.

2. The pallet car according to claim 1, wherein at least one grate bar shows at least one salient such that its supporting surface at which it rests on at least one grate bar is reduced.

3. The pallet car according to claim 1, wherein the insulating plate is provided between at least one part of the pallet car and the grate bar features a specific heat capacity of more than 500 J kg$^{-1}$ K$^{-1}$ and/or features a specific heat conductivity of less than 35 W m$^{-1}$ K$^{-1}$.

4. The pallet car according to claim 1, wherein the cross-beams include at least one upper flange for accommodating at least one grate bar and between upper flange and grate bar an insulating plate is provided.

5. The pallet car according to claim 1, wherein the ceramic composite is a material containing aluminum oxide and/or silicon oxide and/or that the ceramic composite is oxide ceramics.

6. The pallet car according to claim 1, wherein the ceramic composite contains andalusite and/or mullite.

7. The pallet car according to claim 1, wherein the fibers contain iron and/or nickel and/or chromium, silicon, aluminum and/or manganese and/or that the fiber content in the composite material lies between 10 and 90 wt-%.

8. The pallet car according to claim 1, wherein before firing the ceramic composite contains polystyrene, other plastics and/or wood, chopped straw or other biogenic raw materials which largely outgas during firing and leave cavities in the ceramic composite.

9. The pallet car according to claim 1, wherein one side wall is divided into three segments.

10. The pallet car according to claim 1, wherein the side walls are attached to the end pieces of the frame by screws and/or bolts.

11. The pallet car according to claim 1, wherein within the side wall at least one metallic holder is cast in, which protrudes beyond the support surface of the side wall which in operation rests on the end piece or is suitable for accommodating a fastening element and is utilized for attachment to the frame.

12. The apparatus according to claim 1, wherein on the surface facing the frame each side wall contains a metallic carrier plate which at least partly extends between the part of the side wall made of ceramic composite material and the end piece.

13. The pallet car according to claim 12, wherein the metallic carrier plate in at least one direction extends beyond the frame.

14. The pallet car according to claim 1, wherein the side walls are formed such that they get thicker towards the frame.

15. A method for the thermal treatment of bulk material, in which this bulk material is transported through the thermal treatment in a pallet car, wherein the pallet car comprises a frame which on two opposite sides includes rollers, two side walls and grate bars, wherein an insulating plate is provided between at least one part of the pallet car and the grate bar, said insulating plate being made of a ceramic fiber composite formed of metallic and high-temperature resistant fibers and wherein a bed of bulk material at least partly contacting the side walls and/or grate bars is incorporated for the thermal treatment.

* * * * *